(12) United States Patent
Newell

(10) Patent No.: US 11,161,462 B2
(45) Date of Patent: Nov. 2, 2021

(54) METHOD FOR ASSISTING A DRIVER OF A VEHICLE/TRAILER COMBINATION IN MANEUVERING THE VEHICLE/TRAILER COMBINATION, DRIVER ASSISTANCE SYSTEM AS WELL AS MOTOR VEHICLE

(71) Applicant: Connaught Electronics Limited, Tuam (IE)

(72) Inventor: Martin Newell, Tuam (IE)

(73) Assignee: Connaught Electronics Limited, Tuam (IE)

( * ) Notice: Subject to any disclaimer, the term of this patent is extended or adjusted under 35 U.S.C. 154(b) by 463 days.

(21) Appl. No.: 16/305,547

(22) PCT Filed: May 30, 2017

(86) PCT No.: PCT/EP2017/062958
§ 371 (c)(1),
(2) Date: Nov. 29, 2018

(87) PCT Pub. No.: WO2017/207522
PCT Pub. Date: Dec. 7, 2017

(65) Prior Publication Data
US 2021/0221301 A1    Jul. 22, 2021

(30) Foreign Application Priority Data

May 31, 2016  (DE) .......................... 102016109954.6

(51) Int. Cl.
| | | |
|---|---|---|
| *B60R 11/04* | (2006.01) | |
| *B60R 1/00* | (2006.01) | |
| *B60P 1/44* | (2006.01) | |
| *B62D 13/06* | (2006.01) | |

(52) U.S. Cl.
CPC ............ *B60R 11/04* (2013.01); *B60P 1/4471* (2013.01); *B60R 1/00* (2013.01); *B62D 13/06* (2013.01);
(Continued)

(58) Field of Classification Search
None
See application file for complete search history.

(56) References Cited

U.S. PATENT DOCUMENTS 4,480,851 A * 11/1984 St-Pierre .............. B62D 63/061
                                                       180/209
2002/0149673 A1   10/2002 Hirama et al.
(Continued)

FOREIGN PATENT DOCUMENTS

DE      102013020875 A1    6/2015
EP          2181898 A1    5/2010
(Continued)

OTHER PUBLICATIONS

International Search Report and Written Opinion issued in Corresponding Application No. PCT/EP2017/062958, dated Jul. 25, 2017 (10 Pages).
(Continued)

*Primary Examiner* — Clifford Hilaire
(74) *Attorney, Agent, or Firm* — Osha Bergman Watanabe & Burton LLP

(57) ABSTRACT

The invention relates to a method for assisting a driver of a vehicle/trailer combination (1) having a motor vehicle (2) and a trailer (4) in maneuvering the vehicle/trailer combination (1), wherein image data of a rear environmental region (12) of the vehicle/trailer combination (1) is captured by means of a rearward looking vehicle-side camera (6) and/or a rearward looking trailer-side camera (7), an image (B) of the rear environmental region (12) is created depending on the captured image data and displayed on a vehicle-side display device (14), wherein a position (20) of a part (15) of the trailer (4) movable between a stowage position and a use position is determined in the image (B), which is occupied by the part (15) by moving the part (15) from the stowage position into the use position increasing at least one
(Continued)

Figure 1:
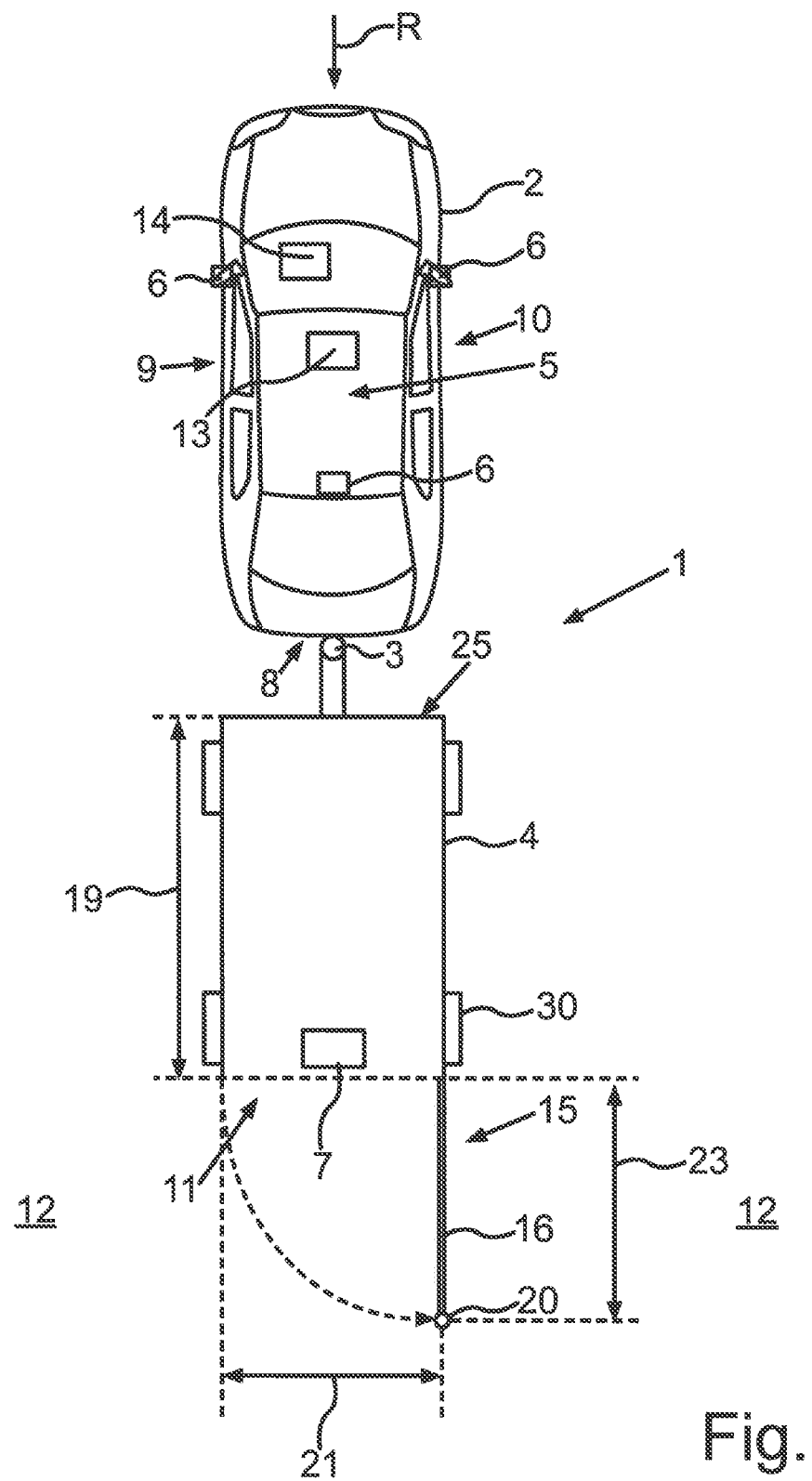

geometric dimension (19) of the trailer (4), and a mark (M1) is displayed in this position (20) in the image (B) on the display device (14). The invention additionally relates to a driver assistance system (5) as well as to a motor vehicle (2).

14 Claims, 4 Drawing Sheets

(52) U.S. Cl.
CPC ... *B60R 2300/305* (2013.01); *B60R 2300/806* (2013.01); *B60R 2300/8086* (2013.01)

(56) References Cited

U.S. PATENT DOCUMENTS

| | | |
|---|---|---|
| 2006/0099067 A1 | 5/2006 | Wigerud |
| 2008/0231701 A1 | 9/2008 | Greenwood et al. |
| 2014/0160276 A1 | 6/2014 | Pliefke et al. |
| 2014/0218522 A1 | 8/2014 | Lavoie et al. |

FOREIGN PATENT DOCUMENTS

| | | |
|---|---|---|
| WO | 2004045903 A1 | 6/2004 |
| WO | 2016/026870 A1 | 2/2016 |

OTHER PUBLICATIONS

Search Report Issued in Corresponding German Application No. 102016109954.6, dated Mar. 7, 2017 (9 Pages).
The Office Action issued in corresponding European Application No. 17 726 312.6, dated Dec. 4, 2019 (6 pages).

\* cited by examiner

METHOD FOR ASSISTING A DRIVER OF A VEHICLE/TRAILER COMBINATION IN MANEUVERING THE VEHICLE/TRAILER COMBINATION, DRIVER ASSISTANCE SYSTEM AS WELL AS MOTOR VEHICLE

The invention relates to a method for assisting a driver of a vehicle/trailer combination having a motor vehicle and a trailer in maneuvering the vehicle/trailer combination, wherein image data of a rear environmental region of the vehicle/trailer combination is captured by means of a rearward looking vehicle-side camera and/or a rearward looking trailer-side camera and an image of the rear environmental region is created depending on the captured image data and displayed on a vehicle-side display device. In addition, the invention relates to a driver assistance system as well as to a motor vehicle with such a driver assistance system. The invention additionally relates to a driver assistance system as well as to a motor vehicle with such a driver assistance system.

It is already known from the prior art to assist a driver of a motor vehicle in maneuvering, in particular in reversing, with a trailer coupled to the motor vehicle. Thereto, predicted movement paths or orientation lines of the trailer can for example be displayed on a display device together with an image of the rear environmental region of the motor vehicle as described in US 2008/0231701 A1. These movement paths describe a presumable movement of the trailer depending on a current steering angle of the motor vehicle.

It is the object of the present invention to provide a solution, how a driver of a vehicle/trailer combination having a motor vehicle and a trailer coupled to the motor vehicle can be particularly reliably assisted in maneuvering the vehicle/trailer combination.

According to the invention, this object is solved by a method, a driver assistance system as well as a motor vehicle according to the respective independent claims. Advantageous embodiments of the invention are the subject matter of the dependent claims, of the description as well as of the figures.

In an embodiment of the method for assisting a driver of a vehicle/trailer combination having a motor vehicle and a trailer in maneuvering the vehicle/trailer combination, image data of a rear environmental region of the vehicle/trailer combination is captured by means of a rearward looking vehicle-side camera and/or a rearward looking trailer-side camera. In particular, an image of the rear environmental region is created depending on the captured image data and displayed on a vehicle-side display device. Further, a position of a part of the trailer movable between a stowage position and a use position can be determined in the image, which is occupied by the part by moving the part from the stowage position into the use position increasing at least one geometric dimension of the trailer. In particular, a mark is displayed in this position in the image on the display device.

Preferably, in a method for assisting a driver of a vehicle/trailer combination having a motor vehicle and a trailer in maneuvering the vehicle/trailer combination, image data of a rear environmental region of the vehicle/trailer combination is captured by means of a rearward looking vehicle-side camera and/or a rearward looking trailer-side camera and an image of the rear environmental region is created depending on the captured image data and displayed on a vehicle-side display device. Moreover, a position of a part of the trailer movable between a stowage position and a use position is determined in the image, which is occupied by the part by moving the part from the stowage position into the use position increasing at least one geometric dimension of the trailer, and a mark is displayed in this position in the image on the display device.

Thus, by means of the method according to the invention, a driver assistance system can be realized, which assists the driver in maneuvering the vehicle/trailer combination, in particular in reversing with the vehicle/trailer combination. The trailer coupled to the motor vehicle can for example be a caravan or a horse trailer. The trailer has the part movable between the stowage position and the use position. The movable part can for example be a ramp extractable from an interior of the trailer, an extractable box and/or a rear, pivotable door of the trailer. During maneuvering, this part is in particular in the stowage position. This for example means that the ramp and/or the box are disposed in the interior of the trailer in the stowage position. Therein, a closed state of the door is to be understood by the stowage position of the rear door. In the stowage position of the part, the trailer has a first geometric dimension, for example a first length.

In particular, after completion of maneuvering, thus, for example in the parked state of the vehicle/trailer combination, the part can be moved from the stowage position into the use position. For example, the door can be moved into the use position by opening it by the driver of the motor vehicle. The ramp and/or the box can be moved into the use position by the driver of the motor vehicle extracting the ramp and/or the box from the interior of the trailer. By this movement of the part from the stowage position into the use position, the at least one geometric dimension of the trailer is increased. This means that in the use position of the part, the trailer has a second geometric dimension, for example a second length, larger compared to the first geometric dimension. Thus, this for example means that a length of the trailer is increased if the ramp and/or the box are extracted from the interior of the trailer and/or the rear door is opened.

Further, an image of the environmental region behind the motor vehicle, in particular behind the trailer, is displayed on the vehicle-side display device. The vehicle-side display device can for example be a head-up display, a screen in an instrument cluster and/or a screen in a center console of the motor vehicle. For creating the image, the image data of at least one camera of the trailer and/or of at least one camera of the motor vehicle is captured. The trailer-side camera can for example be disposed in a rear area of the trailer and capture image data from the environmental region behind the trailer. The vehicle-side camera can for example be a rear camera or reversing camera and capture image data from the environmental region behind the motor vehicle, and/or be a wing mirror camera and capture image data from the environmental region besides and behind the motor vehicle.

When the image data is captured by the vehicle-side camera and the trailer-side camera, an image can be created from this image data, which shows the rear environmental region behind the motor vehicle and behind the trailer, wherein the trailer is only schematically indicted in the image. Thus, the trailer is represented as a "transparent" trailer in the image. This means that the driver gets the impression in looking to the display device as if he could see through the trailer and thus see or capture the environmental region behind the trailer. Thus, the driver obtains information from the environmental region behind the trailer by the image presented on the display device as if the trailer would not be attached to the motor vehicle. In particular, the image data is only captured by the trailer-side camera and the image for the display device is fast and simply created based on this image data. The image thus created therefore shows the environmental region behind the trailer and thus behind the vehicle/trailer combination.

In order to provide information to the driver of the vehicle/trailer combination already during maneuvering, at which location or position in the environmental region the part will be located in the use position, the position is determined for example by an evaluation device of the driver assistance system and additionally marked on the display device. The evaluation device can for example be integrated in a vehicle-side control unit and/or in the camera. Thus, the evaluation device determines the position in particular during maneuvering, while the part is in particular in the stowage position. Therein, the position in particular describes a distance of an area of the part facing the rear environmental region of the trailer. Thus, the position characterizes the maximum extension of the trailer into the rear environmental region. For example, the position characterizes an end of the box and/or the ramp in the extracted state of the box and/or the ramp. In case of the door, the position characterizes the position of a lateral door edge in the opened state of the door.

By displaying the mark in this position of the part in the use position, the driver can for example be prevented from moving too close to an obstacle with the trailer and thus from being no longer able to move the part into the use position without collision in the parked state of the trailer. The driver can also exactly maneuver the trailer to a desired location in the environmental region by displaying the mark. For example, the driver can place or position the trailer formed as a horse trailer at a horse stable such that the box formed as a horse box can be placed at an entrance or gate of the horse stable in the extracted state. Thus, the driver is able to simply and reliably maneuver the vehicle/trailer combination by means of the method. In particular the driver can be prevented from having to reorient the vehicle/trailer combination after parking, for example because he only notices after exiting the motor vehicle that the part is no longer movable from the stowage position into the use position without collision due to an obstacle behind the vehicle/trailer combination.

Therein, it can be provided that the position of the movable part is determined depending on a steering angle of the motor vehicle and/or a pivot angle describing an angle between a longitudinal axis of the trailer and a vehicle longitudinal axis. By the current steering angle of the motor vehicle and/or the pivot angle of the trailer, the position of the trailer relative to the motor vehicle and thereby also the position of the part in the use position relative to the motor vehicle change. This is taken into account by detecting the steering angle for example by a vehicle-side steering angle sensor and/or the pivot angle for example by a sensor device in a tow coupling of the motor vehicle and determining the position depending on the steering angle and/or pivot angle. Based thereon, the mark can be continuously updated in the image and adapted to the changed position, for example when the steering angle of the motor vehicle and/or the pivot angle of the trailer change. Thus, current and significant information is constantly provided to the driver.

Preferably, two orientation lines describing a movement of two opposing wheels of the trailer in maneuvering are predicted and the orientation lines are additionally presented in the image on the vehicle-side display device. Thus, the orientation lines are in particular trajectories or movement paths, along which the opposing wheels of the trailer will presumably move. These orientation lines therefore describe a presumable movement of the trailer and are usually determined depending on the steering angle of the motor vehicle. The pivot angle of the trailer can also be taken into account in predicting the orientation lines. In rectilinearly reversing of the vehicle/trailer combination, thus if both the steering angle of the motor vehicle and the pivot angle are about 0°, the orientation lines extend parallel to the vehicle longitudinal axis and the longitudinal axis of the trailer. Therein, the extension of the orientation lines is in particular also continuously updated, for example when the steering angle of the motor vehicle and/or the pivot angle of the trailer change. Thus, the driver can be particularly reliably assisted in maneuvering by displaying the orientation lines to him in addition to the mark describing a maximum length of the trailer with the part in the use position.

Preferably, the mark is presented in a first color and the orientation lines are presented in a second color different from the first color. The driver of the motor vehicle can be particularly intuitively and fast capture the information associated with the mark and with the orientation lines by the different colors.

Therein, it can be provided that the mark is determined as at least one line intersecting at least one of the orientation lines, and is presented in the image on the vehicle-side display device. Therein, the line describing the mark extends parallel to a transverse axis of the trailer and visualizes an area of the trailer adjoining to the rear environmental region if the part is in the use position. Therein, the at least one line associated with the mark in particular perpendicularly intersects the two orientation lines considering the presented perspective of the image. In this case, the method is particularly simply configured since for example in updating the orientation lines in case of a changed steering angle and/or pivot angle the mark can also particularly simply and fast updated.

In a development of the invention, the position of the part is determined depending on at least one geometric dimension of the trailer and/or of the part. In particular, a length and/or a height of the trailer is taken into account as the at least one geometric dimension of the trailer. With the part in the form of the ramp and/or the box, the position of the part is determined starting from the motor vehicle in particular depending on the length of the trailer as well as a length of the box and/or the ramp. Thus, the distance of the part to the motor vehicle results from the sum of the length of the trailer as well as the length of the part, in particular considering the current pivot angle. With the part in the form of the door, a width of the door is taken into account in determining the position in addition to the length of the trailer. With a single-wing door, the width of the door corresponds to a width of the trailer, with a two-wing door in particular to half of the width of the trailer.

Therein, it can be provided that the at least one geometric dimension of the trailer and/or of the part is acquired based on a user-side input of a value for the at least one geometric dimension of the trailer and/or the part. According to this embodiment, the driver of the motor vehicle can for example input the values for the geometric dimensions of the trailer and/or of the part into a vehicle-side input device. Therein, these values for the dimensions can be stored as configuration parameters in a storage device of the motor vehicle and be read out by the evaluation device for determining the position of the part in the use position.

Alternatively or additionally, the at least one geometric dimension of the trailer and/or of the part is registered in a machine-readable code at an outside of the trailer, the code is captured by the vehicle-side camera and the at least one geometric dimension of the trailer and/or of the part is determined based on the captured code. The code can for example be a so-called QR code. The machine-readable code can for example be disposed on a front side of the trailer facing a rear area of the motor vehicle and thus is located in a capturing range of the vehicle-side camera, for example the rear camera of the motor vehicle. As soon as the QR code has been recognized in the image data captured by the vehicle-side camera, the code can for example be decoded by means of an image processing software of the camera and thus the at least one geometric dimension of the trailer and/or of the part can be extracted from the code. The advantage arises from this embodiment that the geometric dimensions of the trailer and/or of the part can be registered in the code with high accuracy and thus are particularly accurately known. Thereby, the position of the part in the use position can be particularly exactly and reliably determined.

In a further embodiment of the invention, at least two reference trailers with respective different geometric dimensions of the reference trailer and/or a reference part of the reference trailer are stored in a storage device, wherein the at least one geometric dimension of the trailer and/or of the part is determined based on the reference trailer selected by the driver. According to this embodiment, the driver assistance system can be trained, wherein different trailer data is stored in the storage device in the form of the different reference trailers for the driver assistance system thereto. Then, a list of the reference trailers can be displayed to the driver such that he can select that reference trailer from the list, which corresponds to the trailer currently attached to the motor vehicle. The geometric dimensions of the trailer are then provided as configuration data such that the evaluation device, for example the camera-side evaluation device, can determine the position of the part. Thus, the method is particularly simply and user-friendly configured.

In a development of the invention, a gateway for the vehicle/trailer combination is recognized based on the image data, at least one geometric dimension of the gateway is acquired and a further mark is determined depending on the at least one geometric dimension of the gateway and at least one geometric dimension of the trailer and displayed in the image on the display device. By this further mark, the driver is informed if maneuvering the vehicle/trailer combination into the gateway without collision is possible. Therein, in particular in reversing the vehicle/trailer combination, the environmental region behind the trailer is analyzed. Therein, the gateway can be recognized and a width of the gateway can be determined by the image processing device of the camera, for example the trailer-side camera. Depending on a width of the trailer, which is provided to the image processing device for example by the user input, the machine-readable code and/or by means of the selected reference trailer, and the width of the gateway, the further mark is then created. In particular, the width of the gateway is acquired, compared to the width of the trailer and a warning notice is output to the driver of the vehicle/trailer combination as the further mark if a difference between the width of the gateway and the width of the trailer falls below a predetermined threshold value. Thus, the driver can be warned from maneuvering the vehicle/trailer combination into the gateway by the further mark.

In addition, the invention relates to a driver assistance system for a motor vehicle for assisting a driver of a vehicle/trailer combination having the motor vehicle and a trailer in maneuvering the vehicle/trailer combination, wherein the driver assistance system has a rearward looking vehicle-side camera and/or a rearward looking trailer-side camera for capturing image data of a rear environmental region of the vehicle/trailer combination, an evaluation device for creating an image of the rear environmental region depending on the captured image data and a vehicle-side display device for presenting the image in an embodiment. Moreover, the evaluation device is in particular adapted to determine a position of a part of the trailer movable between a stowage position and a use position in the image, which is occupied by the part by moving the part from the stowage position into the use position increasing at least one geometric dimension of the trailer. Further, the display device can present a mark in this position in the image.

Preferably, the driver assistance system for a motor vehicle for assisting a driver of a vehicle/trailer combination having the motor vehicle and a trailer in maneuvering the vehicle/trailer combination has a rearward looking vehicle-side camera and/or a rearward looking trailer-side camera for capturing image data of a rear environmental region of the vehicle/trailer combination, an evaluation device for creating an image of the rear environmental region depending on the captured image data and a vehicle-side display device for presenting the image. Moreover, the evaluation device is adapted to determine a position of a part of the trailer movable between a stowage position and a use position in the image, which is occupied by the part by moving the part from the stowage position into the use position increasing at least one geometric dimension of the trailer. The display device is adapted to present a mark in this position in the image.

A motor vehicle according to the invention includes a driver assistance system according to the invention. The motor vehicle is in particular formed as a passenger car and includes a tow coupling to couple the motor vehicle to a trailer.

The preferred embodiments presented with respect to the method according to the invention and the advantages thereof correspondingly apply to the driver assistance system according to the invention as well as to the motor vehicle according to the invention With indications of "behind", "rearward", "vehicle longitudinal axis", "lateral", etc., the positions and orientations given with an observer sitting in an interior of the motor vehicle and looking in the direction of a vehicle longitudinal axis are specified.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Now, the invention is explained in more detail based on preferred embodiments as well as with reference to the attached drawings.

Figure 2:
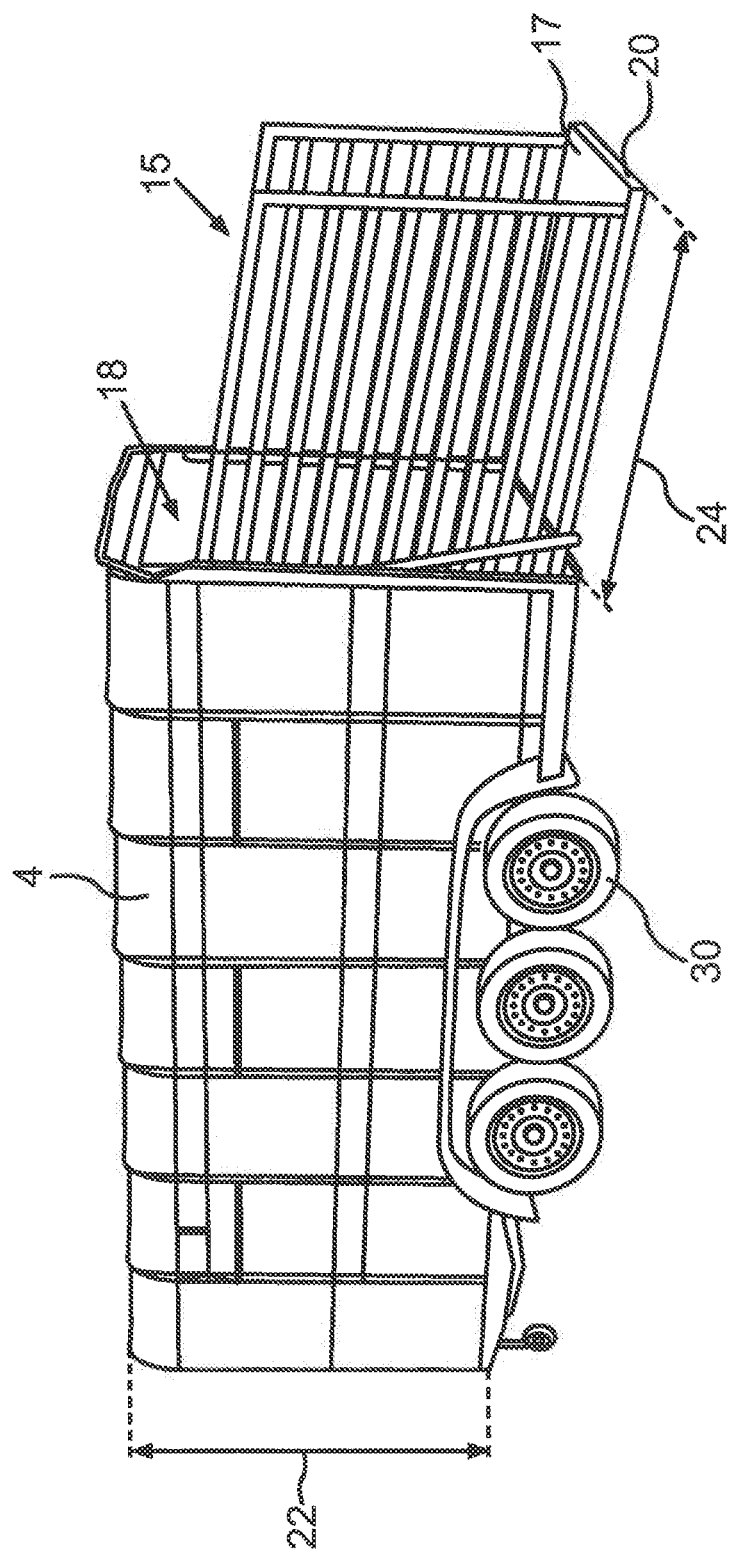
Figure 3:
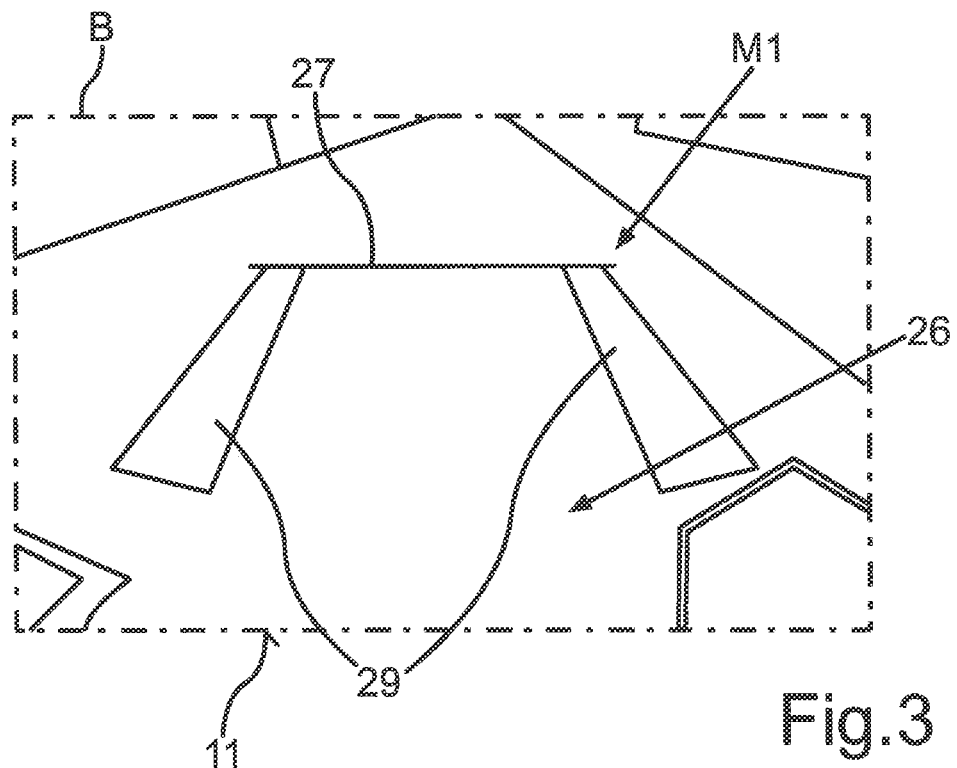
Figure 4:
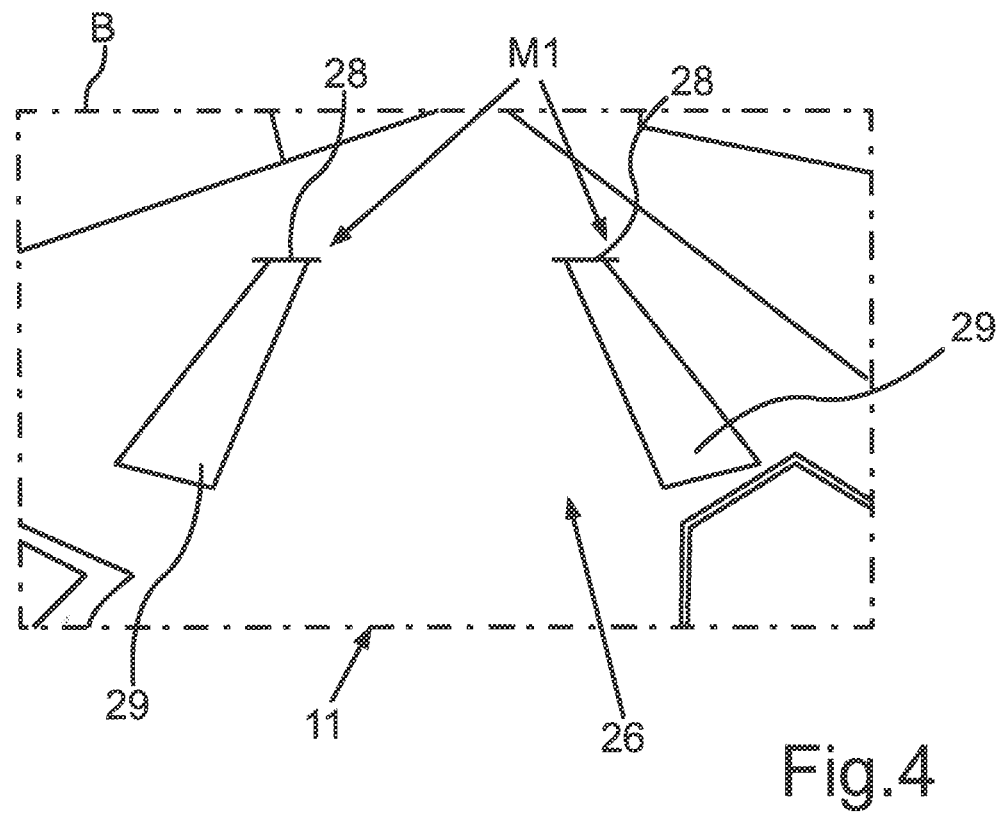
Figure 5:
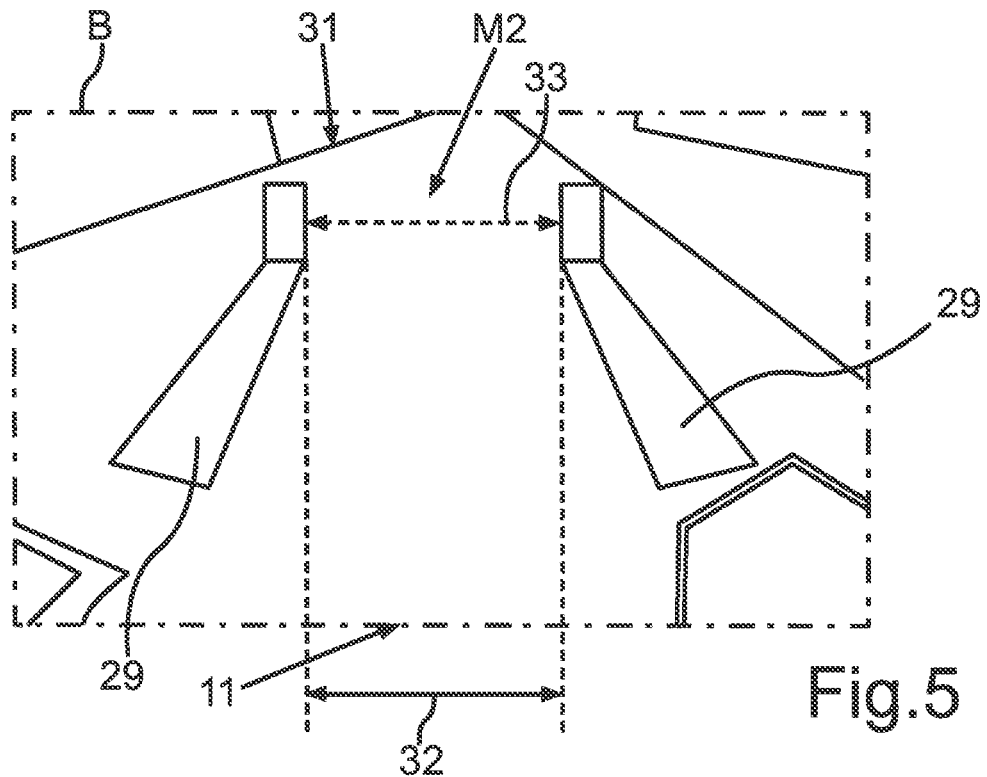
Figure 6:
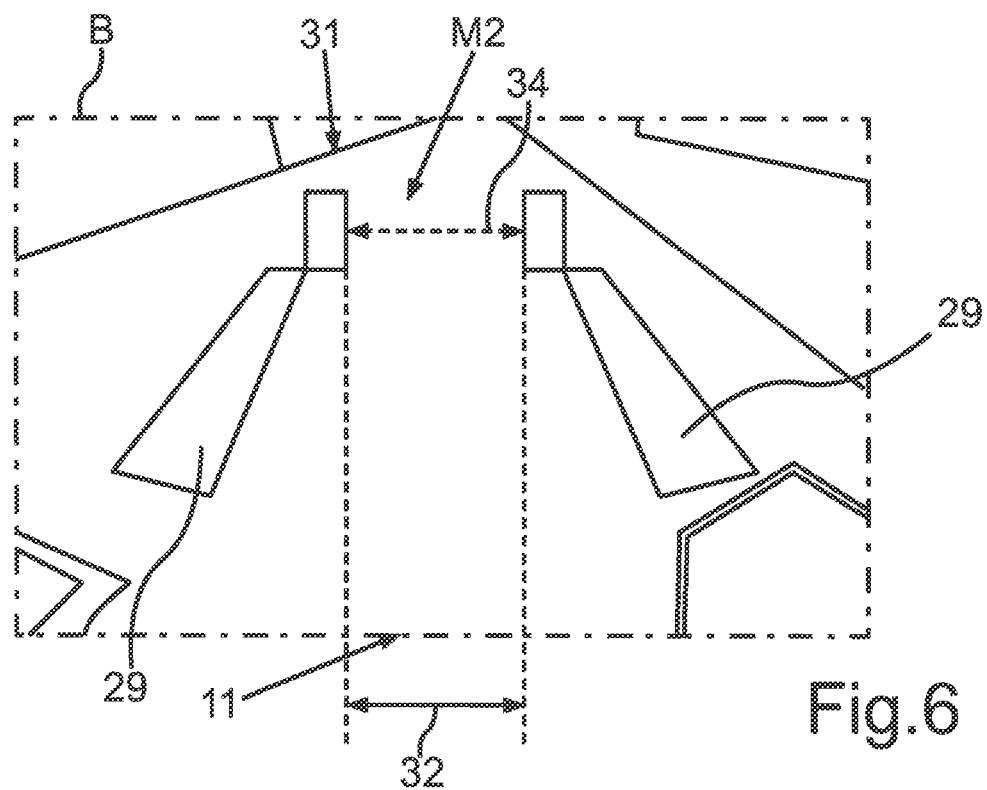

There show:

FIG. 1 a schematic representation of an embodiment of a motor vehicle according to the invention with a trailer in a plan view;

FIG. 2 a schematic representation of a trailer;

FIG. 3 a schematic representation of an image displayed on a display device with a first embodiment of a mark;

FIG. 4 a schematic representation of the image with a further embodiment of the mark;

FIG. 5 a schematic representation of the image with an embodiment of a further mark; and FIG. 6 a schematic representation of the image according to FIG. 5 with a further embodiment of the further mark.

In the figures, identical as well as functionally identical elements are provided with the same reference characters.

FIG. 1 shows a vehicle/trailer combination 1 in a plan view, which has a motor vehicle 2 as well as a trailer 4 coupled to a tow coupling 3 of the motor vehicle 2. In FIG. 2, an embodiment of the trailer 4 is shown in a perspective representation in a side view. For example, the trailer 4 can be a caravan or horse trailer. The motor vehicle 2 includes a driver assistance system 5, which is adapted to assist a driver of the motor vehicle 2 in maneuvering the vehicle/trailer combination 1, thus in maneuvering the motor vehicle 2 with the trailer 4 attached thereto. In particular, the driver can be assisted in reversing with the trailer 4. Thereto, the driver assistance system 5 has at least one vehicle-side, rearward looking camera 6 and/or at least one trailer-side rearward looking camera 7. In the present case, the motor vehicle 2 has three rearward looking cameras 6, wherein a first camera 6, a so-called rear camera or reversing camera, is disposed in a rear area 8 of the motor vehicle 2, a second camera 6 is disposed on a driver's side 9 and a third camera 6 is disposed on a passenger side 10 of the motor vehicle 2. The second and the third camera 6 are so-called wing mirror cameras and can be disposed at a respective wing mirror or at the motor vehicle 2 instead of a respective wing mirror. The trailer-side camera 7 can be disposed in a rear area 11 of the trailer 4. A viewing direction of the cameras 6, 7 is oriented along a rearward direction R such that they can capture image data of the rear environmental region 12 of the vehicle/trailer combination 1. Otherwise stated, the cameras 6, 7 capture the environmental region 12 behind the vehicle/trailer combination 1.

Based on the image data of the cameras 6, 7, an image B (see FIG. 3 to 6) of the environmental region 12 can then be created by an evaluation unit 13, which can be displayed on a vehicle-side display device 14. The evaluation device 13 can for example be integrated in a vehicle-side control unit or be integrated in the cameras 6, 7. For example, the evaluation device 13 can be an image processing device of the trailer-side camera 7, which can communicate the image data to the display device 14 of the motor vehicle 2. By displaying the image B of the rear environmental region 12 on the display device 14, thus, the driver can visually capture the environmental region 12 behind the vehicle/trailer combination 1.

Therein, the trailer 4 has at least one part 15, which is movable between a use position and a stowage position. According to FIG. 1, this movable part is for example formed as a rear door 16 of the trailer 4. According to FIG. 2, the part 15 is for example formed as an extractable box 17. However, the part 15 can also be formed as an extractable ramp. Therein, the part 15 is in the stowage position during maneuvering of the vehicle/trailer combination 1. This means that for example the door 16 is closed during maneuvering or the box 17 is located in an interior 18 of the trailer 4. After maneuvering, thus after parking the vehicle/trailer combination 1, the part 15 can be moved from the stowage position into a use position by the driver. This means that the door 16 is opened and/or the box 17 is extracted from the interior 18 of the trailer 4. Therein, by moving the part 15 from the stowage position into the use position, at least one geometric dimension of the trailer 4 is increased. For example, by opening the door 16 and/or extracting the box 17, a length of the trailer 4 is increased. Thus, the trailer 4 for example has a first length 19 in the stowage position of the part 15 and has a second length in a use position of the part 15, wherein the second length results from the sum of the first length 19 and a geometric dimension 23, 24 of the part 15.

In order to provide information on a position 20 of the part 15 in the use position to the driver of the motor vehicle 2, this position 20 is determined and presented on the vehicle-side display device 14. Therein, the position 20 is in particular determined while the vehicle/trailer combination 1 is maneuvered and the part 15 is therein still in the stowage position. The position 20 describes a maximum distance of the part 15 to the motor vehicle 2 and thereby characterizes a maximum extension, in particular length, of the vehicle/trailer combination 1 in the use position of the part 15. Therein, the position 20 of the part 15 is determined in particular depending on a current steering angle of the motor vehicle 2 and/or a current pivot angle of the trailer 4 with respect to the motor vehicle 2. The position 20 of the part 15 is also determined in particular depending on at least one geometric dimension of the trailer 4, for example the length 19 of the trailer 4, a width 21 of the trailer 4 and/or a height 22 of the trailer 4. The position is in particular also determined depending on a geometric dimension of the part 15, for example a width 23 of the door 16 or a length 24 of the box 17. Here, the door 16 is for example formed as a single-wing door 16 such that the width 23 of the door 16 corresponds to the width 21 of the trailer 4.

The geometric dimensions 19, 21, 22, 23, 24 of the trailer 4 and/or of the part 15 can for example be preset by the driver of the motor vehicle 2. Thereto, the driver can for example input values for the dimensions 19, 21, 22, 23, 24 into a vehicle-side operating device, for example into the display device 14 formed as a touch screen. It can also be provided that a machine-readable code is for example attached to a front side 25 of the trailer 4 facing the rear area 8 of the motor vehicle 2. Such a code can for example be a QR code, in which the geometric dimensions 19, 21, 22 of the trailer 4 and the geometric dimensions 23, 24 of the part 15 can be registered. The rear camera 6 of the motor vehicle 2 can capture this code, evaluate it by means of corresponding software and thus extract the geometric dimensions 19, 21, 22, 23, 24 of the trailer 4 and/or of the part 15. It can also be provided that reference trailers with different reference data are stored in a vehicle-side storage device, wherein the driver can select one of these reference trailers. Then, the reference data of the selected reference trailer can be assumed as the geometric dimensions of the currently arranged trailer 4.

In the determined position 20, a mark M1 is then displayed in the image B as shown in FIG. 3 and FIG. 4. Therein, the image B shows a roadway 26 for the vehicle/trailer combination 1 behind the vehicle/trailer combination 1. In FIG. 3, the mark M1 is illustrated as a solid line 27 and in FIG. 4 as two separate lines 28. Here, so-called orientation lines 29 are additionally displayed in the image B on the display device 14, which visualize the presumable movement of two opposing wheels 30 of the trailer 4. The wheels 30 of the trailer 4 presumably move along these orientation lines 29. The orientation lines 29 are for example determined depending on the steering angle of the motor vehicle 1, the pivot angle of the trailer 4 and the length 19 of the trailer 4. Therein, the orientation lines 29 as well as the mark M1 can be presented in different colors. For example, the orientation lines 29 can be superimposed on the image B of the environmental region 12 as yellow orientation lines and the mark M1 can be superimposed on the image B of the environmental region 12 as a green line. Here, the lines 27, 28 forming the mark M1 intersect the orientation lines 29. Therein, both the orientation lines 29 and the mark M1 are in particular continuously updated and thus adapted to a current direction of travel of the vehicle/trailer combination 1.

As illustrated in FIG. 5 and FIG. 6, a gateway 31 for the vehicle/trailer combination 1 can also be recognized in the image B and a width 32 of the gateway 31 can be determined. This width 32 is compared to the width 21 of the trailer 4 and a further mark M2 is presented on the image B of the display device 14. Based on the further mark M2, the driver is informed if the trailer 4 is wide enough to be able to navigate the vehicle/trailer combination 1 into the gateway 31 without collision. In addition, a height of the gateway 31 can also be determined and be compared to the height 22 of the trailer 4. In FIG. 5, the mark M2 can for example be presented in the form of a line 33 in a first color, for example green, by which the driver can be informed that the width 32 of the gateway 31 is large enough to navigate the trailer 4 into the gateway 31 without collision. As shown in FIG. 6, the mark M2 can be displayed in the form of a line 34 in a second color, for example red, by which the driver is made aware of the fact that the gateway 31 is not wide enough for the trailer 4. An additional warning can also be effected and be presented on the display device 14 if it has been detected that the gateway 31 is not wide enough for the trailer 4. By displaying the orientation line 29 as well as the marks M1, M2, the driver of the motor vehicle 2 can therefore particularly reliably navigate the vehicle/trailer combination 1 since a plurality of information on the environmental region 12 is provided to him on the display device 14.

The invention claimed is:

1. A method for assisting a driver of a vehicle/trailer combination having a motor vehicle and a trailer in maneuvering the vehicle/trailer combination, the method comprising:
capturing image data of a rear environmental region of the vehicle/trailer combination by a rearward looking vehicle-side camera and/or a rearward looking trailer-side camera;
creating an image of the rear environmental region based on the captured image data and displayed on a vehicle-side display device;
determining, in the image, a position of a part of the trailer movable between a stowage position and a use position, which is occupied by the part by moving the part from the stowage position into the use position, increasing at least one geometric dimension of the trailer; and
displaying a mark in the determined position in the image on the display device.

2. The method according to claim 1, further comprising:
determining a position of an extractable ramp extending a length of the trailer in an extracted position, or the position of an extractable box extending a length of the trailer in an extracted position, or of a pivotable door extending a length of the trailer in a pivoted position are determined.

3. The method according to claim 1, wherein the position of the movable part is determined depending on a steering angle of the motor vehicle and/or a pivot angle describing an angle between a longitudinal axis of the trailer and a vehicle longitudinal axis.

4. The method according to claim 1, wherein two orientation lines describing a movement of two opposing wheels of the trailer in maneuvering are predicted and the orientation lines are additionally presented in the image on the vehicle-side display device.

5. The method according to claim 4, wherein the mark is presented in a first color and the orientation lines are presented in a second color different from the first color on the display device.

6. The method according to claim 4, wherein the mark is determined as at least one line intersecting at least one of the orientation lines and is presented in the image on the vehicle-side display device.

7. The method according to claim 1, characterized in that the position of the part is determined depending on at least one geometric dimension of the trailer and/or of the part.

8. The method according to claim 7, wherein the at least one geometric dimension of the trailer and/or of the part is acquired based on a user-side input of a value for the at least one geometric dimension of the trailer and/or of the part.

9. The method according to claim 7, wherein the at least one geometric dimension of the trailer and/or of the part is registered in a machine-readable code at an outside of the trailer, the code is captured by the vehicle-side camera and the at least one geometric dimension of the trailer and/or of the part is determined based on the captured code.

10. The method according to claim 7, wherein at least two reference trailers with respective different geometric dimensions of the reference trailer and/or a reference part of the reference trailer are stored in a storage device, wherein the at least one geometric dimension of the trailer and/or of the part is determined based on the reference trailer selected by the driver.

11. The method according to claim 1, wherein a gateway for the vehicle/trailer combination is recognized based on the image data, at least one geometric dimension of the gateway is acquired and depending on the at least one geometric dimension of the gateway and at least one geometric dimension of the trailer, a further mark is determined and displayed in the image on the display device, by which the driver is informed when maneuvering the vehicle/trailer combination into the gateway without collision is possible.

12. The method according to claim 11, wherein a width of the gateway is acquired, compared to a width of the trailer, and a warning notice is output to the driver of the vehicle/trailer combination as the further mark if a difference between the width of the gateway and the width of the trailer falls below a predetermined threshold value.

13. A driver assistance system for a motor vehicle for assisting a driver of a vehicle/trailer combination having the motor vehicle and a trailer in maneuvering the vehicle/trailer combination, the driver assistance system comprising:
a rearward looking vehicle-side camera and/or a rearward looking trailer-side camera for capturing image data of a rear environmental region of the vehicle/trailer combination;

an evaluation device for creating an image of the rear environmental region depending on the captured image data and a vehicle-side display device for presenting the image, wherein the evaluation device is adapted to determine a position of a part of the trailer movable between a stowage position and a use position in the image, which is occupied by the part by moving the part from the stowage position into the use position increasing at least one geometric dimension of the trailer, wherein the vehicle-side display device presents a mark in the determined position in the image.

14. A motor vehicle with a driver assistance system according to claim 13.

\* \* \* \* \*